United States Patent [19]

White et al.

[11] Patent Number: 4,840,600
[45] Date of Patent: Jun. 20, 1989

[54] LINEAR NEEDLE ROLLER BEARING

[75] Inventors: Craig E. White, Pineville; Bobby L. Hodge, Matthews, both of N.C.

[73] Assignee: INA Bearing Company, Inc., Fort Mill, S.C.

[21] Appl. No.: 47,134

[22] Filed: May 8, 1987

[51] Int. Cl.$^4$ .............................................. F16D 3/30
[52] U.S. Cl. ...................................... 464/111; 384/44; 464/168; 464/905
[58] Field of Search .................... 384/44, 45; 464/111, 464/122, 123, 124, 132, 167, 168, 905

[56] References Cited

U.S. PATENT DOCUMENTS

| | | | |
|---|---|---|---|
| 3,210,136 | 10/1965 | Anderson | 384/44 |
| 4,192,154 | 3/1980 | Nakamura et al. | 464/111 |
| 4,580,995 | 4/1986 | Orain | 464/111 |
| 4,619,628 | 10/1986 | Orain | 464/111 |
| 4,684,356 | 8/1987 | Kimata et al. | 464/111 |

FOREIGN PATENT DOCUMENTS

| | | | |
|---|---|---|---|
| 736676 | 6/1966 | Canada | 464/168 |
| 37-16203 | 10/1962 | Japan | 384/44 |
| 59-40016 | 3/1984 | Japan | 464/111 |
| 861088 | 2/1961 | United Kingdom | 464/168 |

Primary Examiner—Daniel P. Stodola
Attorney, Agent, or Firm—Wigman & Cohen

[57] ABSTRACT

A linear needle roller bearing has a linear needle bearing block having two generally rectangular ends defining an outer peripheral bearing surface therebetween. The outer peripheral bearing surface extends perpendicular to the ends of the bearing block and forms a plurality of linear bearing surfaces. A plurality of needle rollers are disposed on the outer peripheral bearing surfaces and a retaining member is fixed to each end of the block. The needle rollers are standard needle rollers having the shape of right cylinders. Each retaining member has a lip which extends over one end of each of the plurality of needle rollers, thereby retaining the needle rollers on the block.

13 Claims, 2 Drawing Sheets

U.S. Patent  Jun. 20, 1989  Sheet 1 of 2  4,840,600
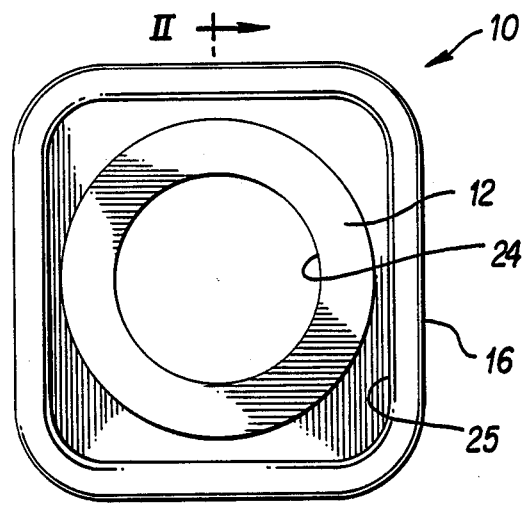
FIG. 1
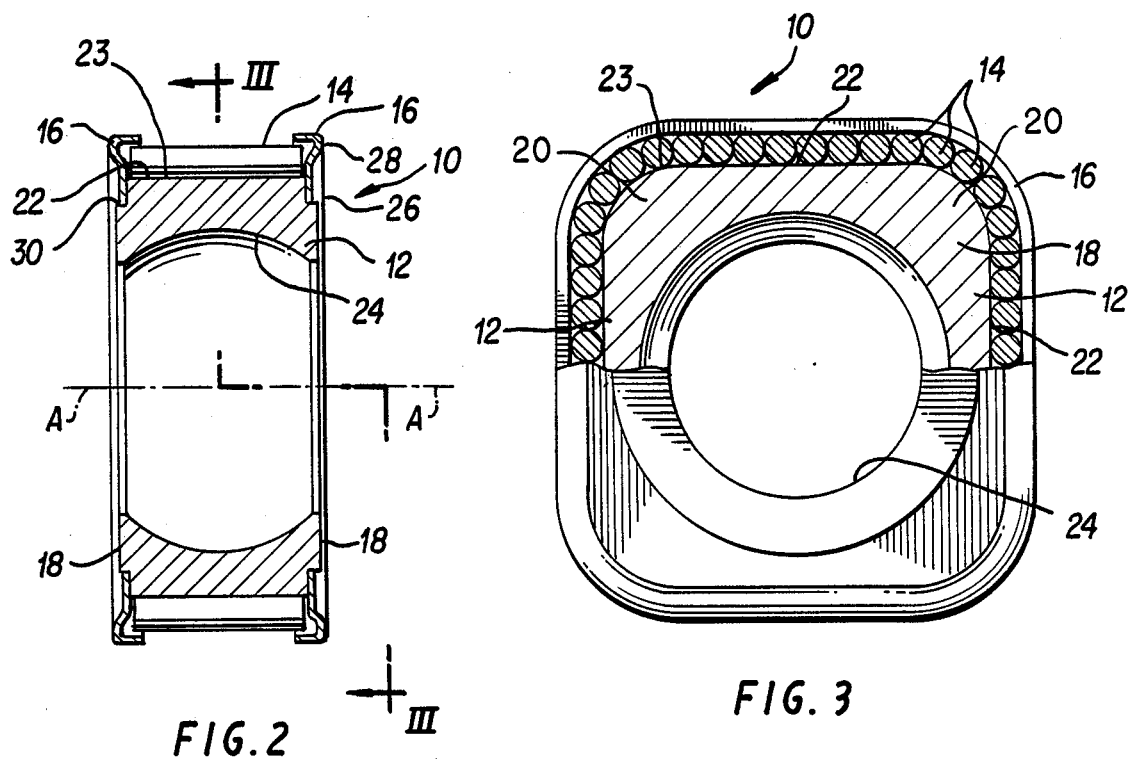
FIG. 2
FIG. 3

LINEAR NEEDLE ROLLER BEARING

FIELD OF THE INVENTION

The present invention relates to anti-friction bearings and more particularly to linear anti-friction bearings having needle rollers retained on the outer surface of a bearing block member.

SUMMARY AND OBJECTS OF THE INVENTION

It is a primary objective of this invention to satisfy a need in the art for a less costly linear needle bearing by providing a linear needle roller bearing which uses standard needle rollers.

More particularly, it is an object of this invention to provide a linear needle roller bearing in which the needle rollers are retained on a linear bearing block member by retainer means which are secure and reliable.

It is another object of this invention to provide a linear needle roller bearing in which the needle rollers are retained on a linear bearing block member by retainer means which are simple in design and readily manufactured.

Yet another object of this invention is to provide a linear needle roller bearing in which standard needle rollers are retained on the outer surface of a linear bearing block member by retainer means which are effective, yet which expose a major portion of the needle roller for sliding or rolling contact with an appropriately configured linear support surface for the bearing.

Still another object of the invention is to provide a constant velocity joint (CVJ) with linear needle roller bearings for providing axial, substantially frictionless sliding contact between the CVJ members.

Briefly described, the aforementioned objects are accomplished according to the invention by providing a linear needle bearing block or bearing member having two substantially rectangularly-shaped ends which define therebetween an outer peripheral bearing surface. The bearing surface extends perpendicularly to the ends and forms a plurality of linear bearing surfaces. A plurality of needle rollers are disposed on the outer peripheral bearing surface. A retaining member formed of sheet material is fixed to each of the ends of the bearing block, each retaining member having a lip extending over one end of each of the plurality of needle rollers, thereby retaining the needle rollers on the bearing block. The lip of each retaining member has a generally C-shape in cross-section with the lip extending completely over one end of each of the plurality of needle rollers and then extending a short distance toward the other end of the rollers. Thus, standard needle bearings with flat or rounded ends may be used with the linear bearings constructed according to the present invention.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a top plan view of a linear needle roller bearing made in accordance with the invention.

FIG. 2 is a cross-sectional view taken along line II—II of FIG. 1, showing one embodiment of a linear needle roller bearing in accordance with the invention.

FIG. 3 is a top plan view of the first embodiment of the linear needle roller bearing of the invention, in partial cross-section, taken along line III—III of FIG. 2.

DETAILED DESCRIPTION OF A PREFERRED EMBODIMENT

Figure 4:
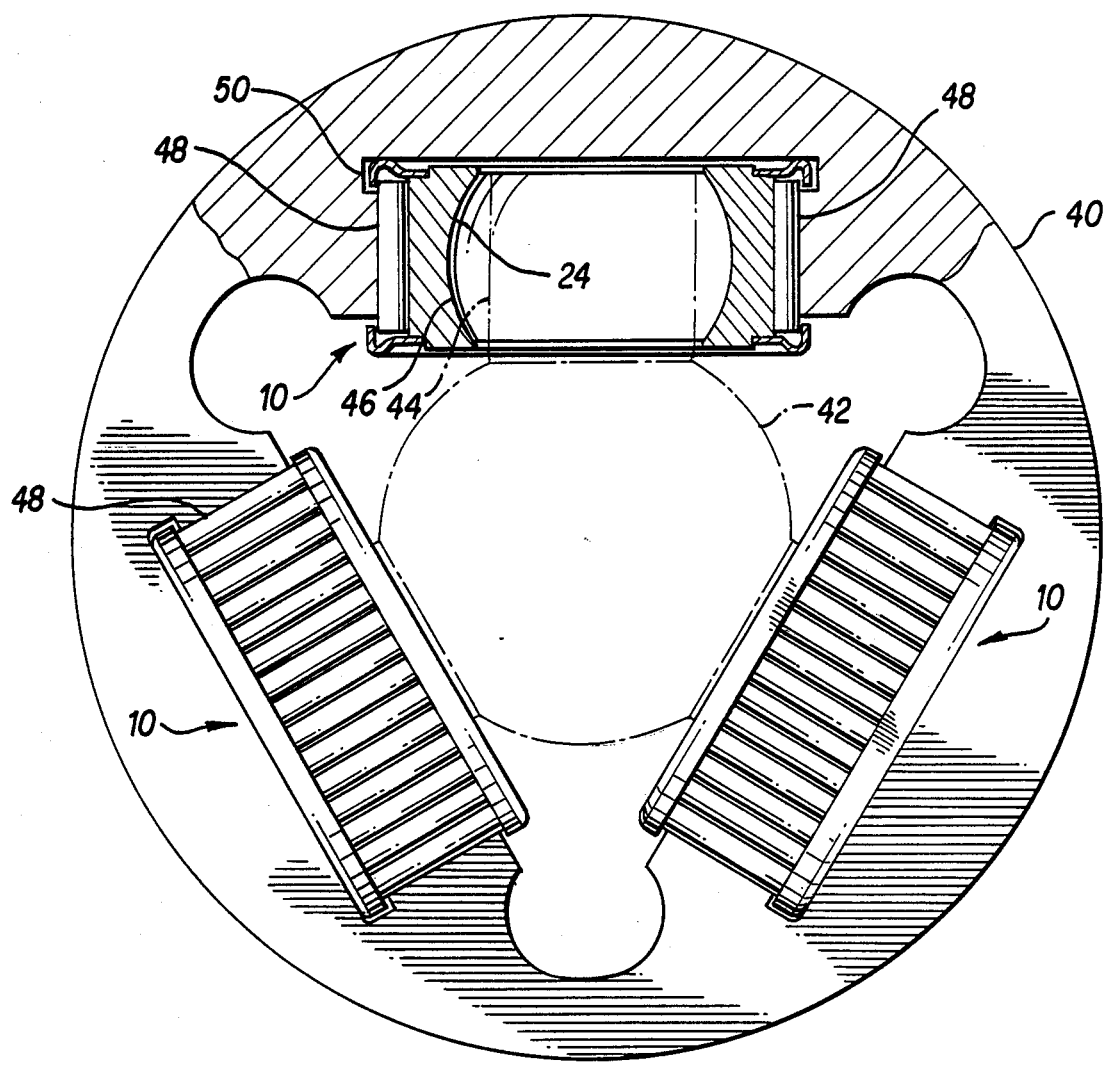
FIG. 4 is a cross-sectional view of a tripod joint containing three linear roller bearings made in accordance with the invention.

Referring now in detail to the drawings wherein like parts are designated by like reference numerals throughout, there is illustrated in FIGS. 1, 2, and 3 a linear needle roller bearing in accordance with the invention which is designated generally by reference numeral 10. Linear needle roller bearing 10 comprises a linear needle bearing block 12, a plurality of standard needle bearings 14, and pair of retaining members 16.

As best seen in FIGS. 2 and 3, linear needle bearing block 12 has a pair of opposed ends 18 defining a generally rectangular six-sided polyhedron with rounded corners 20. For the smooth passage of needle rollers 14, four linear bearing surfaces 22 (only three shown in FIG. 3) are defined on the linear needle bearing block 12 by peripheral surfaces which extend perpendicularly between the two, generally rectangular ends 18 of block 12. Taken together, the four linear bearing surfaces 22 and four rounded corners 20 form an outer peripheral bearing surface 23 for the needle rollers 14. The outer peripheral bearing surface 23 is finished so as to provide a smooth rolling or sliding surface for needle rollers 14 which are retained thereagainst.

An axial bore 24 extends through the center of linear needle bearing block 12. The inner surface of axial bore 24 is spherical with respect to the central longitudinal axis of the bore, shown as axis A—A in FIG. 2, so as to mate with a spherical trunnion or ball of a CVJ, as described hereinafter in connection with the application of the bearing of the invention as shown in FIG. 4.

Needle rollers 14 are positioned on outer peripheral bearing surface 23 so that the central longitudinal axes of the needle rollers are parallel to the planes defined by linear bearing surfaces 23, and perpendicular to the planes defined by the end surfaces 18.

Needle rollers 14 are conventional needle rollers having the shape of elongated right cylinders, with flat or slightly rounded ends. It is an important advantage of the present invention that needle rollers 14 may comprise standard needle rollers, so that the use of specially manufactured needle rollers having trunnions on the ends, tapered ends, or a similarly specially machined structure may be avoided.

Needle rollers 14 are retained on linear needle bearing block 12 by means of retaining members 16. Each retainer member 16 is a generally rectangular sheet metal end cap having a flat mounting portion 26 with a central opening 25 and a formed retaining portion 28. Retaining portion 28 comprises a peripheral lip formed with a generally C-shape in cross-section that extends over one end of each of the needle rollers 14 positioned on outer peripheral bearing surface 23 of linear needle bearing block 12. One retaining member 16 is mounted on each of the ends 18 of linear needle bearing block 12, with the mounting portion 26 of retaining member 16 being fixed to the end 18. Preferably, a circular recess 30 is formed at each of the ends 18 for receipt of the central opening 25 in the mounting portion 26 of each retaining member 16. The retaining member may be positioned by an interference of pilot fit between recess 30 and opening 25. The retaining member may be affixed by a mechanical method, such as staking, or by any other conventional process, such as welding, adhesive bonding, or the like.

Flat mounting portion 26 of retaining member 16 extends outwardly a short distance beyond the outer peripheral bearing surface 23 of linear needle bearing block 12, so as to loosely engage the opposite ends of the needle bearings 14 and retain them against any substantial axial movement. That arrangement advantageously provides for the low friction passage of the ends of needle bearings 14 about the peripheral surface of bearing block 12. The C-shaped lip or retaining portion 28 formed at the outermost perimeter of flat mounting portion 26 of retaining member 16 extends completely over the ends of and slightly axially along the needle rollers 14 so as to prevent any substantial movement of needle rollers 14 away from the outer peripheral bearing surface 23 of linear needle bearing block 12. A major portion of the cylindrical surfaces of needle rollers 14 are exposed between the opposed, outermost free edges of retaining portions 28 of retaining members 16, so as to form a linear roller bearing surface extending completely around the linear needle bearing 10 of the invention. The exposed surfaces of needle rollers 14 permit the linear needle roller bearing 10 to freely and substantially non-frictionally move linearly in a plane parallel to the plane of the ends 18 when the bearing 10 is appropriately mounted in a support member, as described hereinafter in connection with the application depicted in FIG. 4.

Referring now to FIG. 4, a constant velocity joint using three linear needle roller bearings made in accordance with the invention is shown. The constant velocity universal tripod joint is used, for instance, in the transaxle of the front wheel drive system of a motor vehicle wherein the engine transfers power through a transmission to the front wheels of the vehicle. The joint comprises a three lobed housing 40 and an inner rotatable member 42 (shown in phantom) which has three equi-angularly spaced, radially extending trunnions 44. Positioned over each of the trunnions 44 and in each of the lobes of housing 40 is a respective linear needle roller bearing 10 made in accordance with the invention. Each trunnion 44 supports a spherical ball assembly 46 which mates with the spherical surface of bore 24 provided within bearing 10 for universal movement of the trunnion within the bore. Housing 40 is provided with a number of planar support surfaces 48 which extend longitudinally in each lobe of housing 40. Each support surface 48 is provided with a relief portion 50 for accommodating the lip of the retaining member. Support surfaces 48 define parallel walls of longitudinal channels in which the linear needle roller bearing 10 is free to move linearly and longitudinally within housing 40 (into and out of the plane of the paper, as shown in the drawings).

Thus, each of the trunnions 44 and roller assemblies 46, carrying a respective bearing 10, is free to move longitudinally within housing 40 as required by the longitudinal movement of inner rotatable member 42, with the exposed surfaces of needle rollers 14 sliding on support surfaces 48.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A linear needle roller bearing comprising:
    a generally rectangularly shaped linear needle bearing block having two opposed ends and an outer peripheral bearing surface extending between said ends, the corners of said bearing block being rounded, said outer peripheral bearing surface extending perpendicularly to said ends and forming a plurality of linear bearing surfaces;
    an axial bore extending through the center of said linear needle bearing block;
    a plurality of needle rollers disposed on the outer peripheral bearing surface, each of said needle rollers having two ends, a cylindrical rolling surface, a longitudinal axis and a predetermined length; and
    a pair of retaining members, each of said retaining members being fixed to a respective one of the ends of said block, each of said retaining members having a substantially C-shaped lip extending over one of said two ends of each of the plurality of needle rollers and a mounting portion, the mounting portion of each of said retaining members conforming generally to the shape of one of the opposed ends of said bearing block and being fixed thereto, said lip being formed so as to extend outwardly beyond the cylindrical rolling surfaces of said needle rollers and in a direction substantially parallel to the longitudinal axes of said needle rollers such that said lip is engageable and in retaining relationship with the cylindrical rolling surfaces of said needle rollers thereby retaining said needle rollers on said block.

2. The linear needle roller bearing of claim 1 wherein said needle rollers have the shape of right cylinders and a substantially constant diameter from end to end thereof.

3. The linear needle roller bearing of claim 2 wherein said right cylinders have flat ends.

4. The linear needle roller bearing of claim 1 wherein said axial bore has a spherical surface.

5. The linear needle roller bearing of claim 1 wherein said retaining members are formed as a generally rectangularly shaped plate having rounded corners corresponding generally to the shape of the ends of said block.

6. The linear needle roller bearing of claim 5 wherein the mounting portion of each of said retaining members is flat and said generally C-shaped lip extends about the periphery of the mounting portion.

7. The linear needle roller bearing of claim 6 wherein each of said mounting portions has a central opening and the ends of said block are provided with a recess for the receipt of the opening in the mounting portion.

8. The linear needle roller bearing of claim 6 wherein said flat mounting portion extends beyond said outer peripheral bearing surface, thereby forming a channel for the passage of said needle rollers.

9. The linear needle roller bearing of claim 1 wherein said needle rollers are positioned on the outer peripheral bearing surface so that the central longitudinal axes of the needle rollers are parallel to the planes defined by the outer peripheral bearing surface, and perpendicular to the planes defined by the ends of the block.

10. The linear needle roller bearing of claim 1 further comprising a pair of end plates, each of said end plates being fixed to a respective one of the ends of said block, each of end plates having a generally rectangular shape having rounded corners corresponding generally with the shape of said block, the outermost perimeters of said end plates extending beyond the outer peripheral surface of said block, thereby forming a channel for the passage of said needle rollers.

11. A linear needle roller bearing for use in a constant velocity tripod joint of the type having a three lobed housing having three channels extending longitudinally therein, each of said channels defining opposed, longitudinal support surfaces, and an inner rotatable member having three radially disposed trunnions extending into a respective one of said channels, comprising:
   a linear needle bearing block having opposed ends defining therebetween a plurality of linear bearing surfaces;
   a plurality of needle rollers disposed on said linear bearing surfaces, each of said needle rollers having two ends, a cylindrical rolling surface, a longitudinal axis and a predetermined length;
   means fixed to the ends of the block for retaining said needle rollers on said linear bearing surfaces, said retaining means comprising a retaining member fixed to each end of the bearing block, each retaining member having a substantially C-shaped lip extending over the ends of the needle rollers and a mounting portion of each of said retaining members conforming generally to the shape of one of the opposed ends of said bearing block and being fixed thereto, each lip further extending outwardly past the cylindrical surfaces of said needle rollers, and along the cylindrical surfaces of said needle rollers, each lip having a free edge confronting the free edge of the other lip, the spacing between said free edges being less than the length of said needle rollers, whereby said lips retain said rollers on said bearing block.

12. The linear needle roller bearing of claim 11, wherein the mounting portion of each of said retaining members is flat and said generally C-shaped lip extends about the periphery of the mounting portion.

13. The linear needle roller bearing of claim 11 wherein said needle rollers are positioned on said linear bearing surfaces so that the central longitudinal axes of the needle rollers are parallel to the planes defined by the linear bearing surfaces, and perpendicular to the planes defined by the ends of the block.

* * * * *